Figure 1:
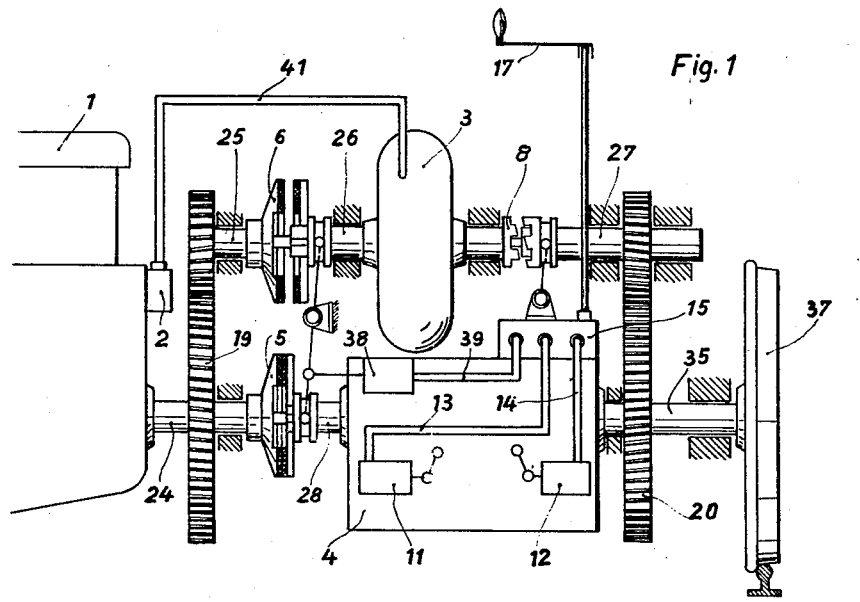

Oct. 19, 1954

K. MAYBACH ET AL 2,691,901

POWER TRANSMISSION FOR MOTOR VEHICLES

Filed Dec. 28, 1949

4 Sheets-Sheet 1

Inventors
Karl Maybach & Hermann Gros
by Karl Michaelis, atty.

Oct. 19, 1954  K. MAYBACH ET AL  2,691,901
POWER TRANSMISSION FOR MOTOR VEHICLES
Filed Dec. 28, 1949  4 Sheets-Sheet 3

Inventors
Karl Maybach & Hermann Gros
by Karl Kishaeler, atty.

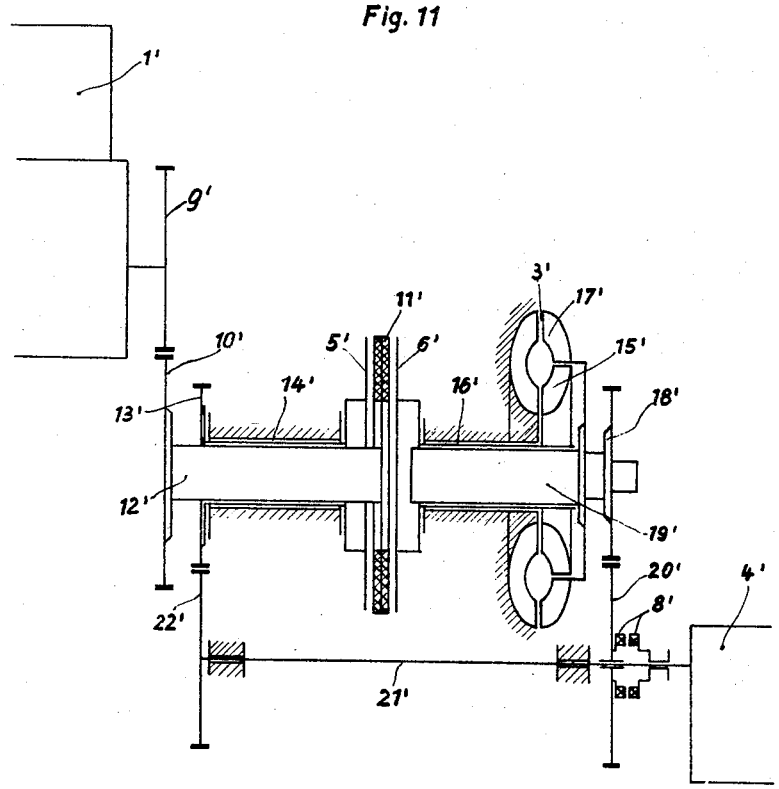

Patented Oct. 19, 1954

2,691,901

UNITED STATES PATENT OFFICE 2,691,901

POWER TRANSMISSION FOR MOTOR VEHICLES

Karl Maybach and Hermann Gros, Friedrichshafen, Bodensee, Germany; said Gros assignor to Maybach-Motorenbau G. m. b. H., Friedrichshafen, Germany, a German firm Application December 28, 1949, Serial No. 135,402

Claims priority, application Germany December 30, 1948

8 Claims. (Cl. 74—655)

The invention relates to power transmissions for motor cars having a mechanical change speed gear for a plurality of speed ranges, a hydraulic transmission for the lowest speed step or the lowest speed steps, and an auxiliary power device for shifting the change speed gear. The invention is intended to be used especially in such cases in which heavy cars have to overcome high and often changing road resistances and speeds, necessitating frequent and troublesome changing of the gears and in many cases in which the operator cannot determine operation of the car by his ear, as is the case, for instance, with motorized rail cars and locomotives and with great busses.

According to the invention a hydraulic transmission is provided for a certain number of speeds. In a further development of the invention the hydraulic transmission is constantly kept filled with an operating liquid and is arranged between clutches adapted to be engaged or disengaged when changing into certain speed steps.

In conventional power transmissions having mechanical change speed gears and hydraulic transmissions, the shifting in or out of the hydraulic transmission proceeds too slowly, because filling and emptying of the transmission takes too much time causing long interruptions in tractive power when the car operates at lower speeds and causing reduction of car velocity. Because of the filling and emptying of the hydraulic transmission, the temperature of the operating liquid and the performance of the transmission is subject to considerable limitations, as most of the oils when used above certain temperatures tend to form vapor which causes insufficient power transmission. Although conventional devices for controlling hydraulic transmissions avoid a number of these drawbacks, they require an awkward and expensive arrangement.

Shifting in or out the hydraulic transmission according to the invention causes no interruption of the tractive power and no reduction of car velocity. The invention provides an extraordinarily powerful and extremely fool-proof power plant at low cost and makes better use of the capacity of the prime mover than conventional arrangements. The clutches for the hydraulic transmission may be comparatively small. When shifting the mechanical speed gears, the usual interruptions in tractive power will occur, but as these changes are not made before a car velocity of 20 to 26 miles per hour is reached, they have no undesired effect on the velocity or on the operation of the car, but assure the good gear efficiency inherent to the exclusively mechanical drive.

In an especially advantageous and simple embodiment of the invention the hydraulic transmission is connected when using the lowest gear speeds and is disconnected at higher gear speeds. The drive may be transmitted through the hydraulic transmission directly to the car wheels or, in a further development of the invention, the hydraulic transmission may be use in combination with the lowest speed step, i. e. at the highest transmission ratio of the change speed gear. When disconnecting the hydraulic transmission, depending on its construction, the speed of the driving engine may be reduced by, say, 15%, according to the ratio between the primary speed and the secondary speed of the hydraulic gear transmission.

An auxiliary device is provided for effecting gear shifting by an auxiliary power, for instance by oil pressure so that the driver need not do any gear shifting. In a further development of the invention a control completely and without error answering the requirements and consequently being on time and providing the needed forces during the gear shifting operation is effected by an automatic gear shifting device by which the changes, especially those from the operation with the hydraulic transmission to mere mechanical drive, but also the changes between the steps of the change speed gear are prepared and controlled in response to one or several operating values as: car velocity, number of revolutions of the motor, torque of the motor, load.

According to the invention a friction clutch is inserted in the direct drive of the change speed gear and another friction clutch is provided in the drive for the hydraulic transmission. An over-running clutch, for instance a claw clutch whose claws have inclined faces is arranged after the hydraulic transmission. Instead of the friction clutch provided in the mere mechanical drive a claw clutch may be used.

After the hydraulic gear a free-wheeling device which needs no control apparatus may be provided instead of the over-running clutch.

With a power transmission according to the invention it is of special advantage to arrange a free-wheeling device between the driving engine and the clutches for simplifying the shifting devices. In that case the number of revolutions may automatically and instantly decrease upon shutting off the fuel supply or when an engine defect occurs. Thus, it is not necessary to drive the engine by means of the mechanical connection with the vehicle drive at a detrimental speed.

As the hydraulic transmission, after having been disconnected, is held in filled state, a constant immediate readiness for operation, and consequently faster shifting is obtained. The hydraulic transmission is mainly used for starting or for slow operation, as for switching of railway cars. Connection and disconnection of the hydraulic transmission is effected at so low a car speed that the hydraulic losses below this speed are of no great consequences. The highest tractive power ever possible are attained.

In a further development of the invention a device for dividing the power is provided which, at low car speeds, causes a portion of the power of the driving engine to be transmitted by the hydraulic transmission while the other portion is directly transmitted, the hydraulic transmission being disconnected for the mechanical drive. At low car velocities the power is transmitted to the car as well by the hydraulic transmission as merely mechanically. It is therefore not necessary to design the hydraulic transmission for the highest output as it transmits only a certain portion thereof which portion is determined by the construction of the dividing gear; the clutches and other connected parts may be made smaller and cheaper. This is especially of advantage with regard to the friction clutches which transmit only a fraction of the power which must be transmitted in conventional mechanisms. By avoiding a portion of the hydraulic losses, an increase in output, a saving in fuel and a decrease of the dimensions of the radiator is attained.

By adequately dividing the flow of power through the transmissions the speed of the engine is reduced and automatically no tractive power will occur which exceeds the adhesion of the car wheels.

An epicyclic gear is preferably used for dividing the flow of power, for instance a gear having pinions which in mere mechanical gear steps are blocked by connecting the sun gear with the planet carrier or with the ring gear. The power dividing gear considerably reduces the engine speed at the same output relatively to the drive through the hydraulic transmission alone, the hydraulic losses being lower because of the smaller amount of power transmitted.

The invention provides an extremely advantageous control for the shifting operations. Changing from operation with the hydraulic transmission to the mechanical drive and vice-versa is performed without interrupting the tractive power, the clutches of one drive only being disengaged while those of the other drive are engaged. Besides, according to the invention, the control of the clutches for the direct drive as well as of those arranged ahead of the hydraulic transmission depends on the shifting stroke of the over-running clutch which is arranged after the hydraulic transmission. The operation of these control devices is preferably hydraulic. For example, when changing from the drive by means of the hydraulic transmission into the merely mechanical drive, the clutches are so controlled that the control means for disengaging the clutches of the hydraulic transmission are not prepared or do not begin to operate before the clutch of the mere mechanical drive begins to be engaged. The shifting stroke of one clutch is delayed relatively to that of the other clutch so that there will be a divisional drive for a short time. An interruption in the transmission and, consequently, of the tractive power to the vehicle does not occur. Only the number of revolutions and, consequently, the output of the driving engine is somewhat reduced. During the double drive the hydraulic transmission receives power and acts in an adjusting manner, preventing shocks and reducing the stress on and the wear of the friction discs, in contradistinction to conventional transmissions which involve considerable losses of power and also wear of clutch linings during the gear shifting operations.

In the opposite case, when connecting the hydraulic transmission, the clutches of the hydraulic transmission already begin to engage before the clutch for the direct drive disengages. The maintenance of tractive power obtained by such a construction of the control causes great advantages in the driving service, above all: uniform drive, quick shifting, omission of shocks, better acceleration of the vehicle than with conventional transmissions.

With the automatic shifting device, according to the invention, the gear change is effected automatically at the right moment (for instance always at the same speed or with the same torque to be transmitted). The gear changes are independent from the feeling, the attention, and the skill of the driver and he may attend fully to the road conditions, to other vehicles meeting or crossing his path, to road signs, etc.

As the working fluid remains in the hydraulic transmission and consequently may be worked at high temperatures, it can be cooled within the hydraulic transmission by a cooling jacket in the casing of the hydraulic transmission. This results in a remarkable simplification of the power transmission plant. There are no heat transformers outside of the hydraulic transmission, no transitions of working fluid from the hydraulic transmission to other places, and therefore no leakage losses, and there is no danger of tube damage as in most cases where it is necessary to arrange the hydraulic transmission and the cooling device at different places on the vehicle. The plant will be simplified in various respects. It is also possible to avoid any expenses for additional construction, for heating the fluid of the hydraulic gear during cold weather by means of the cooling water heated separately or by means of the idly running driving engine.

Due to the installation of a free-wheeling device, known per se, in case of damage of the driving engine, the latter may run at reduced speed, independently of the power transmission, thereby preventing damage. According to the invention a speedier way of gear shifting and a simplification of the change speed gear is obtained by using the hydraulic transmission as a substitute for one or several of the usual braking devices for reducing the speed of the driving part of a clutch to produce the over-running condition affording engagement of the clutch. This is effected according to the invention by engaging during a gear shifting operation, the clutch ahead the hydraulic transmission by means of a suitable control device. This braking effect is much greater than that obtained with the conventional braking arrangements. Whereas the main-clutch must be disengaged with the latter arrangements to reduce the braking time, with transmissions according to the invention, using the hydraulic transmission as a retarding device, disengagement of the main clutch is not necessary, yet gear shifting can be quickly effected, because the high braking effect of the hydraulic transmission suffices not only to quickly brake the power transmitting parts within the change speed gear, but also the engine connected therewith.

The invention favors the use of a change speed gear having claw clutches the teeth of which have inclined front faces for engagement when overrunning, because such gears, aside from constituting an uncomplicated construction, afford an absolute safe and shock-proof gear shifting without special synchronizing clutches or other complicated and not absolutely reliable makeshift devices.

Figure 2:
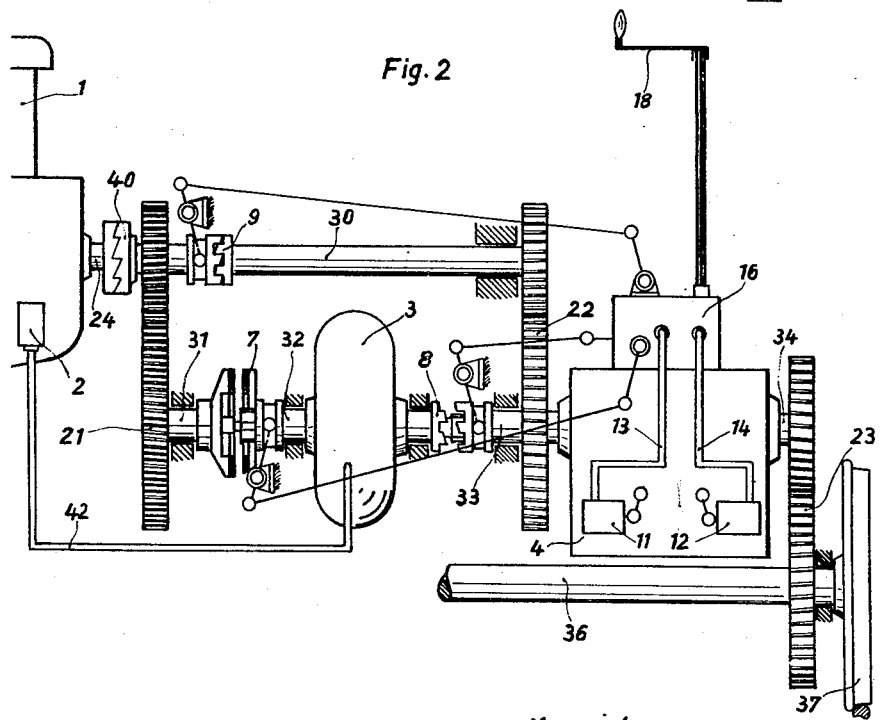

Other objects of the invention and details of power transmissions according to the invention will be described with reference to the drawing in which Figs. 1 and 2 diagrammatically illustrate two complete arrangements of power transmissions, according to the invention, partly in section.

Figure 3:
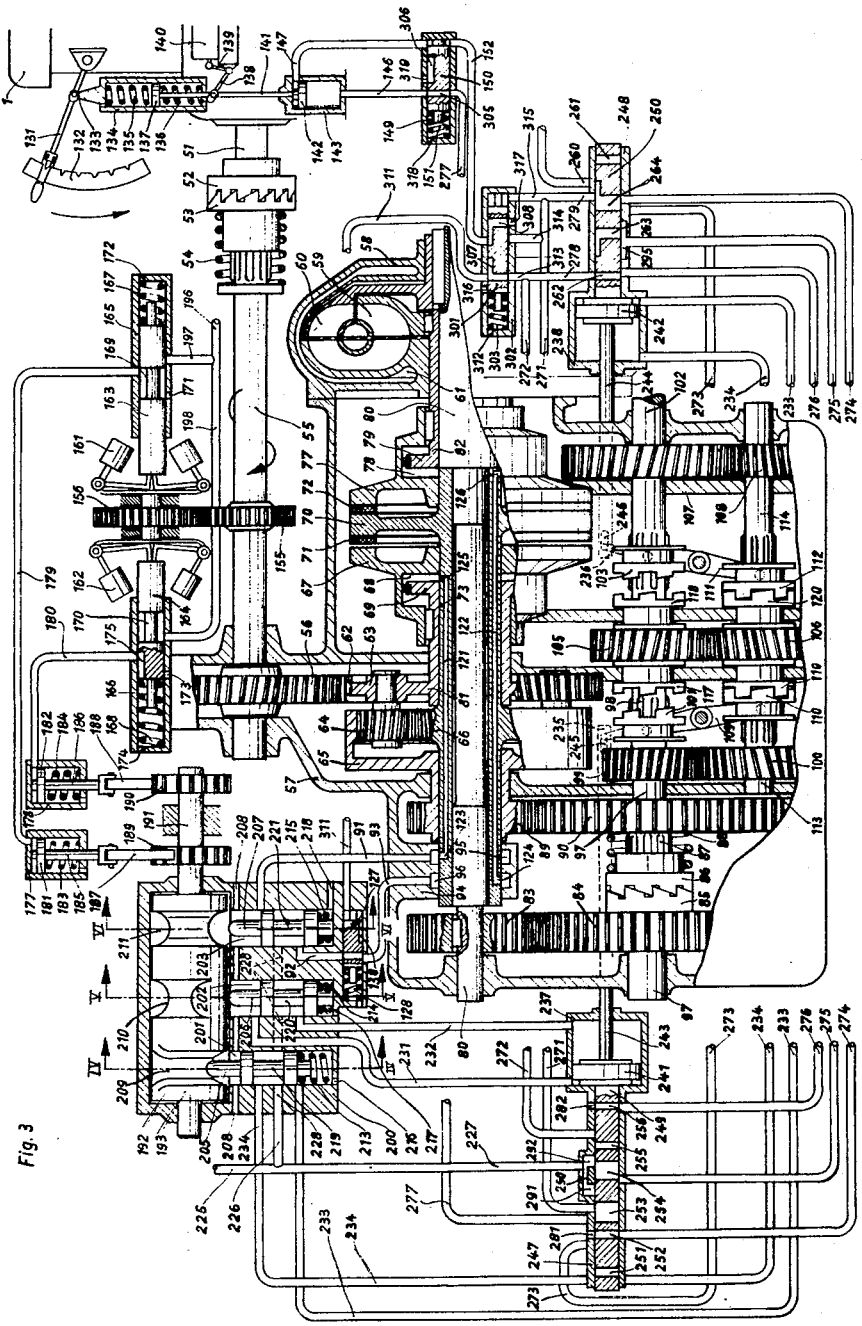

Fig. 3 diagrammatically and mainly in section shows an example of a power transmission, according to the invention, for a locomotive driven by a diesel-engine, in the change speed gear of which, for simplification of the drawing, only four speeds are provided, a hydraulic transmission, a power flow dividing gear and an automatic gear shifting arrangement.

Figure 4:
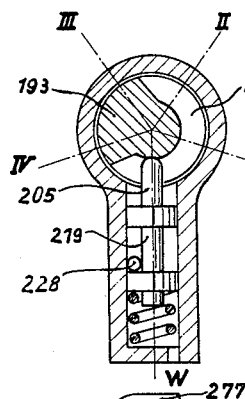
Figure 5:
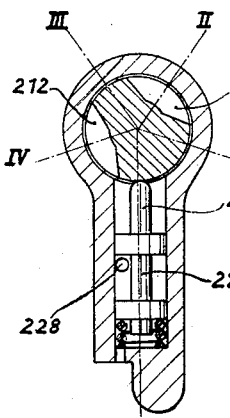
Figure 6:
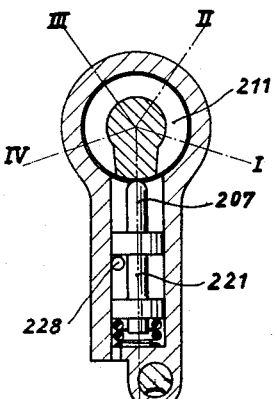
Figure 7:
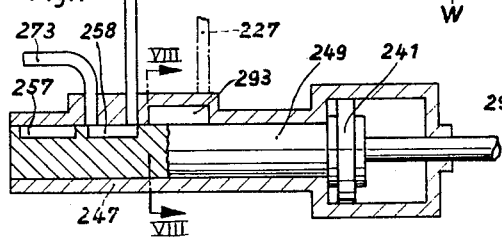
Figure 8:
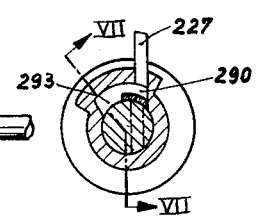
Figure 9:
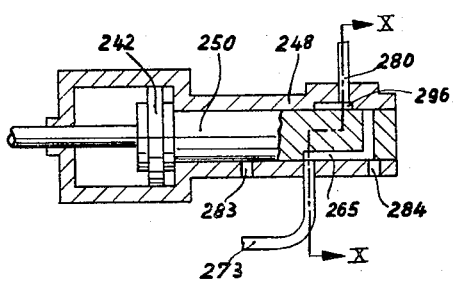
Figure 10:
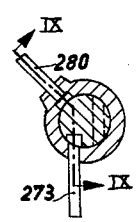

Figs. 4, 5 and 6 are cross sections along lines IV—IV, V—V, and VI—VI of Fig. 3. Fig. 7 is longitudinal section through the slide valve 249 of Fig. 3 along line VII—VII of Fig. 8, the latter figure showing a cross section along line VIII—VIII of Fig. 7. Fig. 9 is a longitudinal section through slide valve 250 of Fig. 3 along line IX—IX of Fig. 10 which illustrates a cross section along line X—X of Fig. 9.

In Fig. 11 the complete arrangement of a further power transmission, according to the invention, is diagrammatically represented.

In Figs. 1 and 2 the numeral 1 designates an internal combustion engine driving a vehicle on rails, 2 a pressure oil pump attached to this engine, 3 a hydraulic transmission, 4 a mechanical change speed gear, 5, 6 and 7 friction clutches, 8 and 9 claw clutches. Numerals 11 and 12 designate shifting cylinders for the change speed gear to which pressure oil is fed by pipe lines 13 and 14 from auxiliary power devices 15 and 16, respectively, according to the position of the operating devices 17 and 18, respectively. Numerals 19 to 23 designate spur gears, 24 to 28, and 30 to 34 designate shafts to be connected by means of the aforementioned spur gears and clutches. Numerals 35 and 36 designate the axles of the vehicles, for which a driving wheel 37 is connected. Numeral 38 designates a gear shifting cylinder to which pressure oil is fed from the auxiliary power device 15 by means of a pipe line 39. 40 is an automatically operating free-wheeling device. Numerals 41 and 42 designate pressure oil pipe lines connecting the pump 2 and the hydraulic gear 3 which is kept filled constantly during normal operation.

With proper setting of the auxiliary power device, according to Fig. 1, shifting cylinder 38 alternately engages the clutch 6 and simultaneously disengages the clutch 5, or vice-versa, depending on whether the vehicle is driven by the hydraulic transmission 3 through gears 19 and 20 or by means of the mechanical change speed gear 4. When engaging clutch 6, claw clutch 8 arranged after the hydraulic gear 3 is also engaged by means of the auxiliary power device 15. After disengagement of the two couplings 6 and 8 for disconnecting the hydraulic transmission 3, the first speed of the mechanical change speed gear is operative for drive by the engaged friction coupling 5. The other speeds are thereafter controlled by the auxiliary power device 15 by means of the shifting cylinders 11 and 12.

Whereas in Fig. 1 the drive is performed through the hydraulic transmission 3 without the mechanical change speed gear 4, in the arrangement according to Fig. 2 the hydraulic transmission 3 is arranged ahead of the mechanical change speed gear 4. Therefore, when the hydraulic transmission is operative the drive is transmitted through the first speed of the mechanical change speed gear to the wheel gear 23 and therefrom to the axle 36 of the vehicle.

The shifting cylinder 38 of Fig. 1 is provided in the embodiment, according to Fig. 2 inside of the auxiliary power device. In both cases the hydraulic transmission 3 is connected or disconnected by engaging or disengaging clutches 6 and 8, or 7 and 8, respectively.

In Fig. 3 numeral 51 designates a shaft driven by the internal combustion engine, which shaft drives a shaft 55 through a free-wheeling coupling formed of two halves 52 and 53 which are compressed by a spring 54. A gear wheel 56 is provided on shaft 55 and journaled in the casing 57. There is an hydraulic transmission or torque converter 58 having driving part formed by a pump wheel 59 and a driven part formed by a turbine wheel 60. The hydraulic converter has a casing equipped with a jacket 61 through which the cooling water flows. 62 are teeth on the periphery of a planetary gear carrier 63 which comprises planetary pinions 64 meshing with the ring gear 65 and the sun gear 66. There is a friction clutch half 67 to which a cylinder 68 containing a piston 69 is attached. 70 is a centre piece having a frictional lining 71 opposite to the coupling half 67 and having on its other side a frictional lining 72 adapted to cooperate with a coupling half 77. The latter is connected to a cylinder 78 adapted to slide therewith and enclosing a piston 79. The centre piece 70 is rigidly connected to the hollow shaft 73, piston 69 being rigidly connected to the planetary gear carrier 63 by means of a hollow shaft 81. Piston 79 is rigidly connected to pump wheel 59 by a hollow shaft 82. Inside of the last-mentioned shafts a shaft 83 is situated to which the turbine wheel 60 and pinion 83 are splined. The latter meshes with wheel 84 carrying on one of its sides half 85 of a free-wheeling claw coupling. Member 85 cooperates with coupling half 86 slidably arranged on splines 87 of a shaft 97 and adapted to be shifted thereon against the pressure of a spring 88. There is a pinion 89 meshing with a spur gear wheel 90 and being rigidly connected to the ring gear 65.

Numeral 92 designates a channel within a control casing 200. There are two pressure oil conduits 91 and 93 communicating with interior annular grooves 95 and 96, respectively, in a casing 94. These grooves also communicate with channels 121 and 122 of the hollow shaft 73 through radial bores 123 and 124, respectively. At their right hand ends the channels 121 and 122 have openings 125 and 126, communicating with the cylinders 68 and 78.

Wheel 84 is loose and wheel 90 is fast on shaft 97, which at its right hand end has rigidly fixed thereto a pinion 99 and has splined thereto, by means of splines 98, a shiftable coupling half 101. Pinion 99 together with gear wheel 100 forms a gear train of the change speed gear which comprises two additional pairs of gear wheels, 105, 106, 107, 108. The gear ratios of these 3 pairs of gear wheels are about 1:2, 1:1,25 and 2:1, respectively. Wheel 107 is rigidly connected to the driving shaft 102, extending to the right of the change speed gear, the left hand end of which shaft carrying a shiftable claw clutch half 103.

The individual speeds of the change speed gear are made up of the following gear wheels:

1. speed: 99—100—108—107 producing a gear ratio 1:4,
2. speed: 105—106—108—107 producing a gear ratio 1:2,5.
3. speed: 99—100—106—105 producing a gear ratio 1:1,6.
4. speed: direct.

The clutch halves 101 and 103 are activated by means of one arm of two-arm levers 109 and 111, the other arms of the levers being individually connected to the shiftable clutch halves 110 and 112 splined to shafts 113 and 114 which are rigidly connected to pinions 100 and 108, respectively. The counterhalves 117 and 118 of the clutch halves 101 and 103, respectively, are rigidly connected to pinion 105, the counterhalves 119 and 120 to the clutch halves 110 and 112, respectively, being rigidly connected to pinion 106.

The claws of the clutches for the different speeds of the change speed gear, as is seen in the drawing, are provided with inclined front faces and immediately on disengagement of one clutch the shiftable half of the clutch alternately cooperating with the first clutch is brought into contact with its counterhalf, engagement being effected at the moment at which the originally slower rotating half begins to over-run the mating half. Over-running may be effected more quickly by conventional auxiliary shifting devices (braking one coupling half or accelerating by increasing fuel supply to the engine).

In the illustrated device the hydraulic transmission is used as auxiliary device for braking the clutch half. For this purpose a valve 127 is provided, operating under the action of a spring 128 and having a transverse channel 129 and a longitudinal groove 130.

131 is a fuel supply control lever cooperating with a segment 132 and connected to a cylinder 134 by means of a rod 133, in which cylinder a piston 137 is situated between springs 135 and 136. Piston 137 is connected to a rod 141 one end of which is connected with a double lever 138, 139 adapted to control a fuel pump 140. A piston 142 slidably arranged inside of casing 143 is connected with the lower end of rod 141. Piston 137 and cylinder 134 are adapted to be moved simultaneously with the fuel control lever 131; cylinder 143 is stationary and is connected by conduits 147 and 148 to a casing 149 in which a valve 150 is slidably arranged and pressed to the right by means of a spring 151. To the casing 149 are also connected conduits 152 and 277.

There is a pinion 155 fast on shaft 55 for driving a gear wheel 156 on a shaft on which centrifugal governors 161 and 162 are arranged adapted to operate valves 163 and 164, respectively, which are situated inside of cylinders 165 and 166, respectively. Governor 161 with valve 163 is for shifting to higher speed and governor 162 with valve 164 serves for shifting to lower speed. By suitably dimensioning compression springs 167 and 168 the speeds are determined for changing to higher or lower speeds. 169 and 170 are annular cavities in the valves 163 and 164, respectively. There are openings 171 and 174 in the cylinders 165 and 166, respectively, connecting to the outside. 175 is a longitudinal groove in the valve 164. 177 and 178 are cylinders connected to the valve cylinders 165 and 166, respectively, by means of conduits 179 and 180, respectively. Cylinders 177 and 178 contain pistons 181 and 182, respectively, adapted to slide therein against the pressure of springs 183 and 184. Pistons 181 and 182 are connected to ratchet wheels 189 and 190 by means of rods 185 and 186 and pawls 187 and 188, respectively, pivoted thereto. The ratchet wheels are fast on the axle 191 of a cam shaft 193 inside of casing 192. There is a pressure pipe line 196 branching into lines 197 and 198 leading to valve casings 165 and 166, respectively.

Numerals 201, 202 and 203 designate cylinders in the valve casing 200 in which control valves 205, 206, 207 are adapted to be moved by means of grooves 209, 210, 211, respectively (Fig. 4, Fig. 5, Fig. 6), of cam shaft 193 against the pressure of springs 213, 214, 215, respectively. There is a transverse channel 208 and there are openings 216, 217, 218 connecting the spaces inside of the valve cylinders with the outside. 219, 220, 221 are annular cavities on the valves 205, 206, 207, respectively. There is a pressure oil feeding line 225 branching into lines 226 and 227. Line 226 connects to casing 200 and there is a continuation thereof in the form of a bore 228 extending through the casing 200 and communicating with the cylinder bores 201, 202, and 203. Conduits 91 and 92 communicate with the interior of cylinder 203, conduits 231 and 232 with that of cylinder 202, and conduits 233 and 234 communicate with the interior of cylinder 201.

To double levers 109 and 111 the ends 235 and 236, respectively, of piston rods 243 and 244, are connected and adapted to be moved by pistons 241 and 242, respectively, sliding inside of cylinders 237 and 238. The end portions 235 and 236 are provided with slots 245 and 246, respectively, adapted to guide pins provided on levers 109 and 111. Pistons 241 and 242 are connected to valves 249 and 250 sliding inside of valve casings 247 and 248 connected to cylinders 237 and 238, respectively. Slide valve 249 is provided with transverse bores 251 to 256. Slide valve 250 has transverse bores 261, 262, as well as angular channels 263, 264, and 265 (Fig. 9) and longitudinal grooves 257 and 258 (Fig. 7). 271 to 277 are connecting lines, 280 (Fig. 9) is a pressure oil feeding line. 290 is a channel in valve casing 247. There are channels 295 (Fig. 3) and 296 (Fig. 9) in the valve casing 248, and connecting openings to the outside 281, 282 (Fig. 3), 283, 284 (Fig. 9). 293 (Fig. 7) is a control channel, 291 and 292 are control ports communicating with the channel 290.

301 is a control valve inside of a casing 302. Valve 301 can be moved against the pressure of spring 303. There are angular channels 307 and 308 in valve 301. 311 is a connecting line. Numeral 313 designates a conduit branching off from line 272. From line 271 short branch lines 314 and 315 lead to valve casing 302.

305 is a cross channel and 306 a longitudinal groove in valve 150. There are openings 316 and 317 in the valve casing 302 and openings 318 and 319 in the casing of valve 150 for connecting the interior of the valves with the outside.

Cam shaft 193 may be rotated clockwise from the position shown in Figs. 4, 5, and 6. When the position of the cams coincides with line W, power is transmitted through the hydraulic transmission. Lines I, II, III, IV indicate the positions of the cams in the 1st, 2nd, 3rd, or 4th mechanical speed.

*Starting*

The different parts of the arrangement are represented in Figs. 3 to 10 in the positions which they occupy immediately after the internal combustion engine 1 has been started by suitable setting of the fuel pump 140 by means of the fuel control lever 131, starting having been effected by means of conventional starting means. Parts 133 to 137, 141 and 142, remain in the shown positions relatively to each other. By means of a pump, not shown, pressure oil is fed into lines 196, 225, and 280 and flows from line 196 into lines 197 and 198 and from line 225 through conduit 226 to channel 228 and through line 227 to the casing 247 of valve 249 and through channel 230, part 292, channel 254 of valve 249, line 275, and channel 295 in casing 248 into the angular channel 263 in valve 250.

Lines 274 and 276, by channels 252 and 256, and openings 281 and 282, respectively, are connected to the outside and are without pressure. Consequently, no pressure is transmitted from line 274 through channel 264 and line 279 to the chamber of cylinder 302 to the right of valve 301 and also no pressure is transmitted from line 276 through channel 262 and lines 278 and 313 into the chamber inside of casing 302 to the left of valve 301. No pressure is transmitted through line 313, chanel 307 and line 311 into the chamber to the right of valve 127. Valves 301 and 127 are in their extreme right positions due to the pressure of springs 303 and 128.

Line 152 is connected with the outside through the angular channel 308 of valve 301 and opening 317. Consequently, the chamber in casing 149 to the right of valve 150 as well as line 147 are without pressure. Valve 150, therefore, due to the pressure of spring 151 will rest in its right hand end position.

Line 277, as is seen in Figs. 7 to 10, is connected with the outside through groove 258 in valve 249, line 273, angular channel 265 in valve 250, and opening 284. Consequently, the space in casing 143 underneath of piston 142 is also without pressure, as it is connected to line 277 by means of channel 305 of valve 150 and by line 146. Because of line 147, which, as explained, is also without pressure, the space in casing 143 above piston 142 is also without pressure. Piston 142, connected by rod 141 to the fuel control arrangement, therefore, follows to the movement of the fuel control lever.

Cam shaft 193 is in the position shown in Figs. 4, 5, and 6. Valves 206 and 207 are in their lower end positions, while the end pin of valve 205 has entered the groove 209 of cam shaft 193 so that valve 205 is situated in its upper end position. From groove 220 of valve 206 pressure oil is fed by means of line 232 to cylinder 237 to the right of piston 241 (Fig. 3), so that the latter is held in its left hand end position. In the illustrated positions of pistons 241 and 242 and of rods 243 and 244, clutches 101, 117, and 103, 118 are disengaged by means of levers 109 and 111 and clutches 110, 119 and 112, 120 are engaged, the slidable halves of the clutches being rigidly connected by means of levers 109 and 111 with those of the clutches 101, 117, and 103, 118, respectively. This causes the first speed of the change speed gear to be effected by means of pinions 99, 100, 108, 107.

The pressure oil fed into groove 221 of valve 207 via channel 228 flows through channel 92, channel 129 of valve 127 and line 93 to groove 96 in casing 94 and therefrom through port 124, channel 122, and the opening 126 to chamber 78. Due to the oil pressure in this chamber coupling half 77 is moved into contact with middle portion 70. The power transmission from the internal combustion engine 1 is effected over free wheeling device 52, 53, shaft 55 and gear wheel 56 to the toothed wheel rim 62 of the planetary gear carrier 63 and therefrom through the planetary pinions 64 to the ring gear 65 and to the sun gear 66. A portion of the driving power is transmitted to shaft 97 by means of pinion 89 connected to the ring gear 65 and by means of gear wheel 90. The portion of the driving power transmitted by the sun gear 66 is transmitted by the hollow shaft 73 to middle portion 70 and by the coupling half 77 and the hollow shaft portion 82 to pump wheel 59 of the hydraulic gear. This portion of the power is transmitted by means of turbine wheel 60, shaft 80, gear wheels 83, 84, and free-wheeling coupling 85, 86 also to shaft 97. The two power portions drive the first pinion 99 of the change speed gear and the power is transmitted to driving shaft 102 by means of the first speed of the change speed gear.

The vehicle, consequently, starts and the driving velocity increases to such a degree as the driver increases power production by means of the fuel control lever 131. At first the larger portion of the driving power is transmitted through the hydraulic transmission. With increasing total power and increasing driving velocity the share of this power portion decreases and the power portion transmitted merely mechanically by means of the ring gear 65 increases.

When the number of revolutions per minute of shaft 55 reaches a predetermined lower limit while operating in a mere mechanical speed, valve 164 moves from its left hand position into its right hand position, because the weights of centrifugal governor 162 do not produce enough resistance to the spring 168 and move to their inner position. When, upon acceleration of the vehicle the aforementioned lower limit of the number of revolutions of shaft 55 is exceeded, valve 164 is shifted from its former right hand position into its left hand position. This very quickly occuring movement causes interruption of the former connection of line 180 with the outside through groove 175 and, for a moment, line 180 is connected with the pressure oil feeding line 198 through the groove 170, but at further increase of the speed of shaft 55, this connection is again interrupted. Consequently, for a moment, by means of line 180 pressure oil is admitted through conduit 180 above piston 182, but a possible downward movement of this piston is not followed by a rotation of ratchet wheel 190, because a further anticlockwise rotation (when looking from left to right in Fig. 3) beyond the illustrated position (for shifting to a still lower speed) is prevented by abutments not visible in the figure.

As a control arrangement of a similar kind for a change speed gear with clutches having overrunning claws is described for instance in the German Patent No. 662,084 and also in the U. S. A. Patent No. 2,086,725, it does not seem necessary to describe all speed changes. In the following the changes from the first to second, from the second to the third, as well as from the fourth to the third, and from the third to the second speed are described.

*Changing into a merely mechanical drive*

When reaching the upper speed changing limit of the driving engine which, for instance, may correspond to a velocity of the vehicle of about 40 km./h., the centrifugal governor 161 shifts valve 163 into its right hand position in which it effects, after having closed opening 171, connection of the upper space in cylinder 177 with the pressure oil feeding line 197 through line 179 and groove 179 and groove 169. Thereby, piston 181 is moved downward against the pressure of spring 183 and rotates cam shaft 193 by means of pawl 187 and ratchet wheel 189. As seen from the left, the rotation is clockwise and amounts to ⅕ of one revolution, so that the lines I in Figs. 4, 5, and 6 are now in the vertically downward position which was previously occupied by the lines W.

This rotation of cam shaft 193 does not change the position of the valves 205 and 206. The pistons 241 and 242 remain in their positions and the first speed remains engaged in the change speed gear. Since there is no pressure in casing 149, valve 150 remains in its right hand end position. Pressure is transmitted from line 227 via line 275 only to channel 263 of valve 250, and, since line 277 is connected by means of groove 258 of valve 249 (Fig. 7) to line 273 and since the latter line is connected by means of cross channel 265 of valve 250 (Fig. 9) with the opening 284 and thus to the outside, line 277 and, consequently, channel 305 of valve 150, line 146, and the space in cylinder 143 below piston 142 are without pressure.

The space inside of casing 143 above piston 142 is also without pressure, because line 147 and line 152 connected thereto are connected with the outside by means of the angular channel 308 of valve 301 and port 317, valve 301 being held in its right hand end position by means of spring 303. Line 315 terminating in the casing 302 beyond the right end of valve 301 is connected with the outside by means of line 279, cross channel 264 of valve 250, line 274, cross channel 252 of valve 249, and port 281.

Due to the rotation of cam shaft 193 the end of the pin of valve 207 has entered the groove 211 of cam shaft 193, causing connection of channel 92, which so far has been supplied with pressure fluid through channel 228, with the outside through the opening 218. Simultaneously, line 91, which so far terminated above groove 221 of valve 207 and has been connected with the outside by means of channel 208, is now connected to the pressure fluid supply conduit 225 through groove 221, channel 228, and conduit 226. Channel 92 is connected with conduit 93 by means of cross channel 129 of valve 127, which is in its right hand end position. Conduit 93 is connected with the part 124 by means of groove 96 in casing 94, port 124 communicating with channel 122 in hollow shaft 73 and through port 126 with the space 78. Space 78, therefore, is without pressure so that the coupling half 77 is no more pressed against the middle portion 70. Consequently, pump wheel 59 of the hydraulic gear is not driven any more.

At the same time, pressure oil is fed from line 91 to space 69 through the groove 95 in casing 94, opening 123, channel 121, and opening 125, and presses the clutch half 67 against the middle portion 70. The planet carrier 63 connected to the friction clutch half 67 by means of hollow shaft 81 may be rigidly connected with the sun gear 66 by pressing the clutch part 67 against the middle portion 70. The entire driving power is now transmitted from pinion 56 by means of the blocked planetary gearing to pinion 89, which drives gear wheel 90 and pinion 99 connected therewith. The power transmission, consequently, is effected merely mechanically by means of the first speed of the change speed gear. Whereas prior to the change from the hydraulic power transmission to the first mechanical speed transmission the driving engine rotated at greatest speed, the speed is now reduced by the difference between the primary and the secondary speed previously effected by the hydraulic torque converter and then increases again with increasing driving velocity.

By a suitable design of valve 207 (thickness of the upper disc of valve 207) and, consequently, of the control of fluid flow in conduits 91 and 92 disengagement of clutch 70, 77 and engagement of clutch 70, 76 may be effected so that no, however short relief of the driving engine will occur, the mere mechanical power transmission increasing at the same rate as the power transmission effected by the hydraulic torque converter decreases.

The wheel 84 is no longer driven by the shaft 80 through pinion 83. Free wheeling device 85—86 interposed between wheel 84 and shaft 97 permits retardation of the speed of wheel 84 relatively to the speed of shaft 97 which is driven by the wheel 90.

*Change from the first into the second mechanical speed*

When the engine resumes top speed, the weights of the centrifugal-governor 161 move outwardly, shifting valve 163 from its left hand into its right hand end position, and oil pressure is again transmitted above piston 181, as described. Cam shaft 193 is rotated again for ⅕ of a revolution so that the lines II in Figs. 4, 5 and 6 point downwards. The position of valves 205 and 207 does not change thereby and clutch 67, 70 remains engaged, piston 242 remains in its right hand end position and claw coupling 120, 112 remains engaged.

Valve 206, because of groove 210 on cam shaft 193, moves from its lower position, in which it had been until now, to its upper end position (Fig. 5). Feeding of pressure fluid from line 226 through channel 228 and groove 220 to line 232 is interrupted, the latter being connected by opening 217 to the outside so that the space to the right of piston 241 in cylinder 237 is without pressure. Line 231, however, is connected through the recess 229 in valve 206 to channel 228 and the space in cylinder 237 to the left of piston 241 is supplied with pressure oil, causing piston 241 to be moved from its left hand end position to the right, whereby the clutch part 110 is disengaged from the clutch half 119. At the same time, the previous connection between lines 227 and 275 through channel 254 of valve 249 is interrupted. Opening 282 is closed by means of valve 249. The connection of line 273 to line 277 through groove 250 of the valve 249 is interrupted (Fig. 7) at the beginning of the aforedescribed movement and condut 277 is connected to line 227 by means of groove 290. Thus, pressure fluid is fed to the space underneath the piston 142 in casing 143 by means of line 277, channel 305 of valve 150 and line 146. The space above piston 142 in casing 143 is connected to the outside by means of line 147 and 152, angular channel 308 of valve 301, and opening 317, and is without pressure. The rod 141 is shifted upwardly against the pressure of spring 135 and the fuel pump 140, by means of double lever 138, 139 is set for idling. Valve 301 is kept in its right hand end position, although during the disengagement of coupling 110, 119 pressure fluid may enter in front of valve 301 via lines 271 and 315 from line 227 and through groove 290, control opening 291 and channel 253 of valve 249. This temporary connection with a pressure line does not cause a shifting of valve 301. Upon disengagement of the clutch 110, 119, line 272 is connected by means of channel 254 of valve 249 via control opening 292 and groove 290 to the pressure line 227, so that valve 301 is held in its right end position by means of the pressure fluid fed into the space in front of the left hand end face of valve 301 and by the pressure of spring 303. Thus, pressure fluid may flow from line 313 via channel 307 of valve 301 into line 311. Consequently, valve 127 is shifted into left hand end position so that the connection between channel 92 and line 93 is interrupted and line 93 is connected to the pressure fluid feeding line 311 through groove 130. The pressure oil fed from line 93 via groove 96, channel 122 and opening 126 into space 78 engages coupling 70, 77 so that the pumping wheel of the hydraulic torque converter is rotated. After disengagement of the claw clutch 110, 119 the rotational speed of the claw clutch half 101 and of the parts of the transmission connected therewith is rapidly reduced. It is not necessary to disengage the free-wheeling device 52 on shaft 55, because the speed of the motor is also reduced due to the braking effect of the converter 58. When the speed of the clutch part 101 is reduced to the speed of the clutch part 117 and the claws of part 117 overrun those of part 101, the clutch 101, 117 is engaged.

When the left hand control edge of channel 258 has reached the right hand control edge of line 277 (Fig. 7) the connection from pressure line 227 to line 277 via groove 290 is interrupted and line 277 is again connected to line 273 by the groove 257 in valve 249 and no pressure fluid enters line 277. Upon continued movement of valve 249 to the right, conduit 277 is connected to the outside so that the space in casing 143 underneath piston 142, which communicates with line 277 is again without pressure and piston 142 moves into the position to which it was previously moved by manipulation of lever 131. When the piston 241 and valve 249 are in their extreme right positions, line 276 is connected to the outside through channel 255 and port 282 so that channel 262 of valve 250, line 278, angular channel 307 of valve 301, line 311, and the space to the right of valve 127 are without pressure and the valve 127 moves into its right hand end position, connecting the space 78 with the outside via channels 218, 92 and 129, line 93, groove 96, channel 122 and control opening 126, so that the clutch 70, 77 is disengaged.

*Change from the second into the third mechanical speed*

Upon reaching upper shifting speed, valve 163 operated by the centrifugal governor 161 causes further rotation of cam shaft 193, so that line III (Figs. 4–6) extends vertically downward. This does not change the position of valve 205. Valves 205 and 206 are moved from their upper into their lower end positions. This causes feeding of pressure fluid to lines 232 and 233 so that pistons 241 and 242 are moved to the left. Thus, in the manner described above, line 277 receives pressure fluid from line 227 through the grooves 290 and 258 (Fig. 7) and piston 142 is moved upwards so that the fuel supply to the engine is interrupted. Lines 147 and 152 and the upper space of casing 143 are connected through the angular channel 308 and opening 317 with the outside and are without pressure.

It does not matter which one of the two claw clutches which must be disengaged is disengaged first. It is assumed that both clutches (101, 117 and 120, 112) are disengaged simultaneously and that the front faces of the claws of the clutches 110, 119 and 118, 103 are adjacent, but reject each other. The two pistons 241 and 242 are in corresponding positions (about half-ways of their stroke) and cause pressure fluid to be fed from line 227 via groove 290 and channel 253 of valve 249 into lines 271 and 315. This would cause movement of valve 301 to the left, if the conditions described in the paragraph below would not prevent it, and pressure fluid would be admitted to cylinder 143 from line 271 via line 314, angular channel 308 of valve 301, lines 152, and 147 so that the piston 142 would be moved downward and the fuel supply would be increased. Simultaneously, the pressure fluid fed to casing 149 via line 152 would move the valve 150 to the left, so that the space below piston 142 in casing 143 is connected with the outside by means of line 146, groove 306 of valve 150 and opening 319.

Increase of fuel supply, however, is prevented, because valve 250 has also moved into its middle position and pressure fluid is fed from line 227 via channel 253 of valve 249 into line 275 and therefrom via the angular channel 263 of valve 250 into line 278 and by means of line 313 into the space of casing 302 to the left of valve 301. The pressure acting on valve 301 towards the right together with the pressure of spring 303 is greater than the pressure exerted against the right hand end face of this valve. Thus, valve 301 moves into the right hand end position, as represented in the drawing. Consequently, pressure fluid flows into line 311 via line 313 and angular channel 307 of valve 301 and through valve 127 and line 93 into space 78 and causes engagement of the friction clutch 70, 77. The braking effect of the torque converter causes a quick reduction of the rotational speed of the clutch half 118 to be engaged, if clutch 101, 117 is not yet disengaged. If clutch 101, 117 is already disengaged, the speed of the wheel pair 106, 105 is quickly reduced, because of its small mass and because of the braking effect of the oil contained in the gear.

Clutch 118, 103 will be the first one to be engaged and the piston 242 will be moved to its extreme left position. Since piston 241 is still in its middle position, the oil pressure in line 271 moves valve 301 into its left hand end position. Line 311 is connected by the angular channels 307 with the opening 316 and is without pressure. This causes shifting of valve 127 to the right and in the manner described above disengagement of clutch 70, 77. Simultaneously, pressure fluid flows from line 314, via angular channel 308 of valve 301 and lines 152 and 147 into the space above piston 142 in casing 143, so that the fuel pump is set for greater fuel supply to the engine, at the same time causing valve 150 to be shifted into its left hand end position and rendering the space of casing 143 underneath of piston 142 pressure-less by means of line 146, groove 306 and opening 319. The rotational speed of the clutch half 110 is thereby so increased that the clutch 110, 119 can be engaged and piston 241 together with valve 249 is shifted into its left hand end position.

The pressure fluid fed from line 280 (Fig. 9) when piston 242 is in its middle position, and through valve 250 into line 273 is ineffective while valve 249 is in its middle position, the pressure oil advancing only as far as the groove 257. After piston 242 has reached its left hand end position, line 273 connected with the opening 283 by means of channel 265 is also without pressure, so that, when piston 241 has reached its left hand end position, no pressure fluid flows from line 273 to line 277.

*Increasing the gear ratios.—Change from the fourth to the third mechanical speed*

In the 4th speed piston 241 is in its right and piston 242 is in its left end position. In the 3rd speed piston 242 is also situated in its left hand end position, whereas piston 241 has been shifted from its right hand into its left hand end position. These, as well as all other changes to higher gear ratios are initiated by the reduction of the engine speed to the speed which calls for gear shifting and which causes dropping of the weights of the centrifugal governor 162 and movement of valve 164 from its left hand into its right hand end position so that pressure fluid is fed from line 198 via groove 170 into line 180 which previously was without pressure, groove 170 in valve 164 having been connected with the opening 173. The fluid pressure moves piston 182 in cylinder 178 downward so that the pawl 188 rotates cam shaft 193 anticlock-wise, as seen from the left in Fig. 3, from position IV into position III, line III in Figs. 4–6 being now in vertical position. This does not affect the positions of valves 205 and 207. Valve 206, however, moves from the recess 212 of the cam shaft 193 and, therefore, from its upper to its lower end position. Consequently, line 232 formerly having been without pressure is now fed with pressure fluid and line 231 is without pressure. When changing from the 4th into the 3rd speed, piston 241 is moved to the left and causes the same change as during the second part of the change from the 2nd into the 3rd speed when the fuel supply is increased.

*Change from the third to the second mechanical speed*

In the 3rd speed both pistons 241 and 242 are in their left hand end positions. For setting the 2nd speed both pistons have to be shifted into their right hand end positions. This change is initiated, like the change from the 4th into the 3rd speed, by the centrifugal governor 162 activating valve 164 and so on, valve 207 remaining in its upper position, but valves 205 and 206 moving from their lower into their upper positions. This causes feeding of pressure fluid into line 231, formerly having been without pressure, while line 232 is connected to the outside; at the same time pressure fluid is fed to the previously pressure-less line 234 while line 233 is connected to the outside.

Assuming that the pistons 241 and 242 have reached their middle positions corresponding to the position of the clutch halves 101 and 112 in which they are rejected from their counterhalves 117 and 120, respectively, pressure fluid is fed from line 227 via channel 254 of valve 249 into line 272 and further on into line 311 and, after shifting of valve 127 to its left hand position, via channel 130 of valve 127, line 93, and channel 122 in hollow shaft 73 to space 78 so that the friction clutch 70, 77 is engaged, the torque converter reducing the rotational speed of the clutch half 101. After engagement of the latter with the counterhalf 117 pressure fluid is fed via channel 253 of valve 249, which is in its right hand end position, line 275, via channel 264 of valve 250, and lines 279 and 315 in front of the right hand end face of valve 301, thereby pushing valve 301 into the left hand end position, so that pressure fluid flows from line 314 via cross channel 308 of valve 301 and lines 152 and 147 to the space of casing 143 above piston 142 and pushes this piston downward, increasing the fuel supply. Upon increasing the speed of the clutch half 120, clutch 120, 112 is engaged. Thereafter the operation is analogous to that during the change from the 2nd into the 3rd speed.

*Change from the mere mechanical drive into the drive by the hydraulic torque converter*

The change into the drive by the hydraulic torque converter effected at a predetermined reduction of the velocity of the car by rotation of cam shaft 193 from position I into position W (line W being vertical in Figs. 4–6) does not cause a change of the positions of valves 205 and 206. Consequently, there will be no movement of pistons 241 and 246 and no shifting of the clutches in the change speed gear. But valve 207 (Fig. 6) will be moved from its upper into its lower position. Line 91 and also chamber 68 having been under pressure are now connected via channel 208 (position shown in Fig. 3) with the outside and clutch 70, 67 is disengaged, while line 93 which had been without pressure because of its connection to opening 218 is now fed with pressure fluid from channel 228 via recess 221, channel 92 and cross channel 129 of valve 127. The pressure fluid is conducted also to chamber 78 through groove 96 and channel 122 of hollow shaft 73 and presses clutch half 77 against the middle portion 70. This causes operation of the hydraulic torque converter.

Whereas with the mere mechanical drive in the 1st speed a definite speed of the internal combustion engine was maintained, cutting in of the hydraulic torque converter causes a difference in the speed of shafts 73 and 90. The driving shaft 97 of the change speed gear is driven merely mechanically by means of the ring gear 65 and the spur gears 89 and 90 are also driven by means of the hydraulic torque converter through the spur gears 83, 84. As long as there is a difference between the speeds of the gear wheels 84 and 90, free-wheeling device 85, 86 will stay disengaged. As soon as these wheels rotate at the same speed, the free-wheeling device will be automatically engaged.

Fig. 11 diagrammatically shows a part of an arrangement similar to that of Figs. 1, 2 and 3. Numeral 1' designates an internal combustion engine, 3' a hydraulic torque converter, 4' a change speed gear, 5' and 6' halves of a friction clutch, 8' a claw clutch, 9' a gear wheel on the motor shaft meshing with a gear wheel 10', and numeral 11' designates the middle portion of a double friction clutch connected with a shaft 12'. There is a pinion 13' on a hollow shaft 14' connected to clutch half 5'. A clutch half 6' and a pump wheel 15' are connected to hollow shaft 16', a turbine wheel 17' as well as a gear wheel 18' being rigidly connected to shaft 19'. Gear wheel 18' meshes with a gear wheel 20' loosely on shaft 21' to which it may be connected by means of claw clutch 8'. Gear wheel 22'—rigidly connected to shaft 21'—meshes with pinion 13'.

Fig. 11 represents the principle of assembling a power transmission according to the invention having no gear for dividing the flow of power. There are two friction clutches, one half of each of which being mounted on a hollow shaft. The two friction clutches have a common middle portion. The shifting devices for the clutches and the speed changing gears are omitted in Fig. 11. When driving by means of the hydraulic torque converter and the spur gear 18', 20', friction clutch 11', 6' and claw clutch 8' are in engagement, while for the mechanical drive by means of gears 13', 22' the friction clutch 11', 5' is engaged.

We claim:

1. A power transmission system for vehicles driven by an internal combustion engine comprising, in combination, a drive shaft connected with the internal combustion engine, a mechanical change speed transmission, first mechanical power transmitting means connecting said drive shaft with said change speed transmission, said change speed transmission comprising a plurality of gear trains having different gear ratios, alternately operative claw clutches interposed between said gear trains for selectively connecting pairs of said gear trains for power transmission, each of said claw clutches having a pair of mating parts individually provided with claws having inclined front faces affording overrunning of the mating parts; a permanently filled hydraulic torque converter having a driving and a driven part, second mechanical power transmitting means connecting said first power transmitting means with the driving part of said converter, a friction clutch interposed in said second transmitting means, third mechanical power transmitting means connecting the driven part of said converter with said change speed transmission, a clutch interposed in said third power transmitting means, and automatic actuating means connected with said claw clutches and with said friction clutch, said actuating means comprising means for selectively engaging said claw clutches for consecutively connecting said gear trains to consecutively step down and step up the gear ratio of said change speed transmission, said actuating means comprising means to engage said friction clutch when said gear trains are connected for producing the greatest gear ratio of said change speed transmission.

2. A power transmission system as defined in claim 1, said hydraulic converter comprising a casing and a coolant circulating jacket in said casing.

3. A power transmission system as defined in claim 1 comprising speed responsive control means connected with said drive shaft and with said automatic actuating means for controlling the latter in accordance with the speed of said drive shaft.

4. A power transmission system according to claim 1 comprising a free wheeling clutch interposed between the engine and said drive shaft.

5. A power transmission system according to claim 1, said automatic actuating means including means for engaging said friction clutch while said claw clutches are in neutral position prior to being engaged for shifting to produce a new gear ratio.

6. A power transmission system according to claim 1 comprising a second friction clutch interposed between said first and said second mechanical power transmitting means, and said actuating means comprising means for alternately actuating said two friction clutches.

7. A power transmission system for vehicles driven by an internal combustion engine comprising, in combination, a drive shaft connected with the internal combustion engine, a mechanical change speed transmission, first mechanical power transmitting means connecting said drive shaft with said change speed transmission, a hydraulic torque converter having a driving part and a driven part, second mechanical power transmitting means connecting said first power transmitting means with the driving part of said converter, a first clutch interposed in said second power transmitting means, a second clutch interposed between said first and said second power transmitting means, third mechanical power transmitting means connecting the driven part of said converter with said change speed transmission, a third clutch interposed in said third power transmitting means, and automatic actuating means connected with said first and with said second clutch for alternately actuating said two clutches and including means affording a time lag between the actuation of said two clutches.

8. A power transmission system for vehicles driven by an internal combustion engine comprising, in combination, a drive shaft connected with the internal combustion engine, a mechanical change speed transmission, first mechanical power transmitting means connecting said drive shaft with said change speed transmission, a hydraulic torque converter having a driving part and a driven part, second mechanical power transmitting means connecting said first power transmitting means with the driving part of said converter, a first clutch interposed in said second power transmitting means, a second clutch interposed in said first power transmitting means, third mechanical power transmitting means connecting the driven part of said converter with said change speed transmission, a third clutch interposed in said third power transmitting means, and automatic actating means connected with said first and with said second clutch for alternately actuating said two clutches and including means for actuating said third clutch and affording a time lag between the actuation of said third clutch and the actuation of said first two clutches.

(References on following page)

References Cited in the file of this patent

UNITED STATES PATENTS

| Number | Name | Date |
|---|---|---|
| 1,193,132 | Feltz | Aug. 1, 1916 |
| 1,770,937 | Martin | July 22, 1930 |
| 1,900,119 | Lysholm | Mar. 7, 1933 |
| 2,014,944 | Martyrer | Sept. 17, 1935 |
| 2,156,493 | Durrell | May 2, 1939 |
| 2,190,831 | Dodge | Feb. 20, 1940 |
| 2,241,764 | Bollinger | May 13, 1941 |
| 2,258,684 | Lysholm | Oct. 14, 1941 |
| 2,302,714 | Pollard | Nov. 24, 1942 |
| 2,353,905 | Kelley | July 18, 1944 |
| 2,418,378 | Voytech | Apr. 1, 1947 |

FOREIGN PATENTS

| Number | Country | Date |
|---|---|---|
| 393,296 | Great Britain | May 30, 1933 |
| 517,519 | Great Britain | Feb. 1, 1940 |
| 875,016 | France | Sept. 3, 1942 |
| 888,949 | France | Feb. 27, 1943 |
| 890,868 | France | Feb. 21, 1944 |